United States Patent
Jarrin et al.

[11] Patent Number: 6,110,550
[45] Date of Patent: Aug. 29, 2000

[54] LIMITED PERMEABILITY SHEATH AND APPLICATION TO PRESSURE PIPES

[75] Inventors: Jacques Jarrin, Nanterre; Louis Perrin, Champlan, both of France

[73] Assignee: Institut Francais du Petrole, France

[21] Appl. No.: 08/976,636

[22] Filed: Nov. 24, 1997

[30] Foreign Application Priority Data

Nov. 22, 1996 [FR] France ................................ 96 14432

[51] Int. Cl.[7] ................. F16L 57/06; F16L 9/18; F16L 11/14; F16L 9/147
[52] U.S. Cl. ................. 428/36.91; 428/421; 428/458; 428/469; 428/586; 138/131; 138/134; 138/146; 138/154; 252/188.28
[58] Field of Search ................. 428/36.9, 36.91, 428/586, 421, 422, 458, 461, 469; 138/118, 131, 134, 146, 154; 252/188.28

[56] References Cited

U.S. PATENT DOCUMENTS

| | | | |
|---|---|---|---|
| 3,966,431 | 6/1976 | Craig et al. | 48/197 |
| 4,402,346 | 9/1983 | Cheetham et al. | 138/129 |
| 4,510,974 | 4/1985 | Natori et al. | 138/137 |
| 4,714,597 | 12/1987 | Trevino | 423/228 |
| 4,903,735 | 2/1990 | Delacour et al. | 138/133 |
| 4,943,489 | 7/1990 | Kuhara et al. | 428/586 |
| 5,019,189 | 5/1991 | Kumura et al. | 148/127 |
| 5,555,916 | 9/1996 | Kushida | 138/177 |
| 5,686,016 | 11/1997 | Veldman et al. | 252/188.28 |

FOREIGN PATENT DOCUMENTS

| | | |
|---|---|---|
| 0 541 329 | 5/1993 | European Pat. Off. . |
| 541329 A1 | 5/1993 | European Pat. Off. . |
| 62-84153 A | 5/1993 | Japan . |

OTHER PUBLICATIONS

Patent Abstracts of Japan, Publication No. 62084153, Publication Date: Apr. 17, 1987 (JP 60–225377; Oct. 9, 1986).
Database WPI, Section Ch, Week 8721, AN: 87–148693; Derwent Publications Ltd., London, GB (XP 2034251).
Chemical Abstracts, vol. 107, No. 12 (Abstract No. 100531), Columbus, OH USA.
Derwent Abstract of JP 62–84153 A; Vulcanizing Rubber Compositions for Fuel Hoses, Apr. 1987.

*Primary Examiner*—Ellis Robinson
*Assistant Examiner*—John J. Figueroa
*Attorney, Agent, or Firm*—Millen, White, Zelano & Branigan, P.C.

[57] ABSTRACT

The present invention relates to flexible pipes with metal armors and metal tubes having a sheath made of an extrudable thermoplastic material for manufacturing an acid gas tight barrier.

The sheath comprises a determined proportion of at least one charge of a product chemically active with acid gases so as to irreversibly annihilate the corrosive effects of these gases, the proportion being determined as a function of the gas permeability of the thermoplastic material.

13 Claims, 1 Drawing Sheet

LIMITED PERMEABILITY SHEATH AND APPLICATION TO PRESSURE PIPES

FIELD OF THE INVENTION

The present invention relates to a line that can be used notably for transportation of fluids and comprising at least one inner sealing sheath allowing at least to limit permeability to corrosive fluids, notably acid gases, for example $H_2S$ and $CO_2$.

The invention notably applies to hydrocarbons transported in pipes likely to be under high pressure and at high temperatures for long periods of time.

BACKGROUND OF THE INVENTION

Pipes can be metal tubes internally lined with a thermoplastic tube of limited permeability, or flexible pipes comprising for example the following elements:

a frame made of interlocked steel tape intended to prevent collapse of the pipe due to the differential pressure between outside and inside, an inner sealing sheath made of a plastic material intended to provide inner sealing of the pipe, at least one layer of metal armours to withstand compressive and/or tractive stresses, a second external sheath made of a plastic material providing external sealing of the pipe.

The problems inherent in transportation of fluids at high temperature and pressure are linked with the permeability of plastic sheaths. It is well-known that the flow of gas through the thermoplastics used for manufacturing sealing sheaths increases with the temperature and the pressure. In the case of corrosive gases, such as $H_2S$, the metal armours or tubes can undergo accelerated corrosion. Furthermore, in the case of a flexible pipe, the gas can accumulate between the two sheaths, which can lead to bursting of the external sheath when the external sheath is less permeable.

Document EP-0,225,901 describes an inner sheath whose permeability is reduced by spiral winding of a fine metal strip around a plastic sheath. However, the areas of superposition of the strips remain very gas permeable areas.

SUMMARY OF THE INVENTION

The present invention thus relates to a sheath made of an extrudable thermoplastic material for manufacturing an acid gas tight barrier. The sheath comprises a determined proportion of at least one charge of a product chemically active with acid gases so as to irreversibly annihilate the corrosive effects of said gases, the proportion of charge being determined as a function of the gas permeability of said thermoplastic material.

The present invention is mainly based on well-known chemical reactions carried out in the field of acid gas cleaning processes, notably resulting from the presence of $H_2S$ and of $CO_2$, but not at all used for manufacturing sealing sheaths made of extrudable thermoplastic polymer, for example polyolefins, polyamides, fluoropolymers, which currently constitute the industrial sheaths in the field of flexible or rigid oil production pipes. The following irreversible reactions can be mentioned:

Charges comprising metal oxides:

$$PbO + H_2S \rightarrow PbS + H_2O \quad (1)$$

$$ZnO + H_2S \rightarrow ZnS + H_2O \quad (2)$$

It is the same with CuO, CdO, NiO, CoO, SnO2 and MoO3.

Charges comprising amines such as alkanolamines or polyethylene polyamines:

| | | | |
|---|---|---|---|
| $2RNH_2 + H_2S$ | $\rightarrow$ | $(RNH_3)_2S$ | (3) |
| $(RHN_3)_2S + H_2S$ | $\rightarrow$ | $2RNH_3HS$ | (4) |
| $2RNH_2 + CO_2 + H_2O$ | $\rightarrow$ | $(RNH_3)_2CO_3$ | (5) |
| $(RNH_3)CO_3 + CO_2 + H_2O$ | $\rightarrow$ | $2RNH_3HCO_3$ | (6) |
| $2RNH_2 + CO_2$ | $\rightarrow$ | $RNHCOONH_3R$ | (7). |

It can be seen from reactions 3 and 4 that $H_2S$ reacts directly and rapidly with MEA or any other primary amine, to form amine sulfide and hydrosulfide. The same reactions occur between $H_2S$ and secondary or tertiary amines such as DEA, DIPA and MDEA.

Carbon dioxide reacts according to Equations 5, 6 and 7. Reaction 7, which gives the formation of an amine salt of a substituted carbamic acid, is direct and rapid but it can occur only between $CO_2$ and a primary or secondary amine. Reactions 5 and 6 are slower because $CO_2$ must react with water to form carbonic acid prior to reacting with the amine.

The polyethylene polyamine used can be PEHA or HEPA of general formula H2N(C2H4NH)nH with n=5 for the PEHA and n ranging between 5 and 7 for the HEPA. Of course, these polyamines are generally mixtures.

Charges comprising alkaline or alkaline-earth oxides:

$$CaO + H_2S \rightarrow CaS + H_2O$$

$$CaO + CO_2 \rightarrow CaCO_3$$

$$Ca(OH)_2 + CO_2 \rightarrow CaCO_3 + H_2O.$$

The agents selected react with the $H_2S$ or the $CO_2$ in non reversible reactions in the presence of oxygen, in the working conditions of the sheaths. It is in fact desirable, once the acid gas absorbed, that no other chemical reactions which might lead to consequences for the thermoplastic sheath occur.

BRIEF DESCRIPTION OF THE DRAWINGS

Other features and advantages of the invention will be clear from reading the example hereafter, with reference to the accompanying drawings wherein.

DETAILED DESCRIPTION OF THE INVENTION

Figure 1:
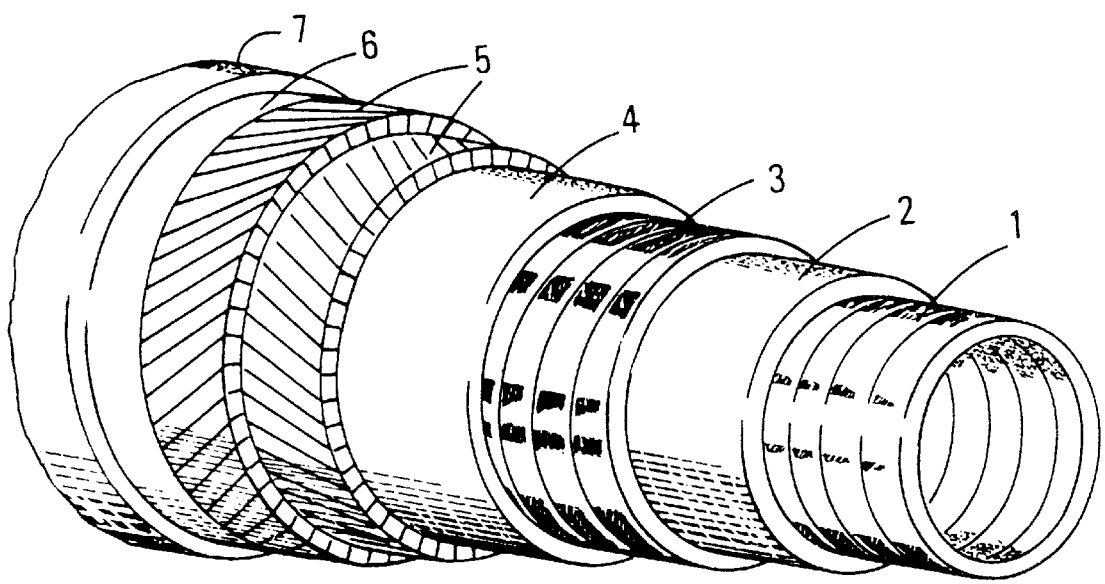
FIG. 1 shows a flexible pipe structure comprising at least one sheath according to the invention.

The volume of acid gas that can enter a thermoplastic sheath of permeability Pe can be estimated by means of the following formula:

$$Q = (Pe * S/e) * p * t$$

where S is the surface in contact with the gas and t the gas exposure time interval.

where S the surface in contact with the gas, "e" by itself is the thickness of the sheath, and t the gas exposure time interval.

From the measurements performed by the claimant, permeability Pe is of the order of $10^{-7}$ cm$^3$/cm.s.bar for the permeability, at about 100° C., of PVDF or PA 11 to $H_2S$ (PVDF is polyvinylidene fluoride and PA 11 is a is polyamide 11).

For a sheath with an inside diameter of 15 cm, the surface per meter of tube is thus S=4712 cm².

Considering a H₂S pressure of 3 bars and a sheath thickness of 7 mm, the daily flow of gas Q is of the order of:

$Q=(10^{-7}*4712)/0.7*3*24*3600=174$ cm³/day.

H₂S being considered to be a perfect gas, one mole of H₂S corresponds to a volume of 22400 cm³, therefore 174/22400=0.0078 mole/day of H₂S enters a unitary length of the sheath considered, which gives for a year: about 2.85 mole/year.

This approximate theoretical calculation does not take account of the sheath surface masking effect of the metal armours surrounding the sheath. It is well-known that, in structures such as armored hoses, the permeability is at least divided by a factor greater than 2.

Furthermore, if the sheath is not directly in contact with the effluent, the average temperature can be substantially below 100° C., which highly decreases the permeability of the thermoplastic sheath.

It can also be noted that pure H₂S at a pressure of 3 bars was taken into account in this calculation, which corresponds to about 300 bars of an effluent comprising 1% of H₂S.

Knowing the permeability rate of a plastic sheath, either by calculation or by experimentation, the amount of neutralizing agent for the acid gases contained in an effluent that is to be incorporated into the extrudable thermoplastic material in order to protect from the permeability of a sheath made from said material is determined according to given operating conditions.

For a sheath with an inside diameter of 15 cm and a thickness of 0.7 cm, the volume of polymer is about 3450 cm³. For polymers whose density is about 1, 1 meter of sheath is 3450 g in weight.

Considering the aforementioned reactions, the following proportions are required to neutralize 2.8 moles of H₂S per year and per meter of tube:

for ZnO 228 g, i.e. a proportion of 6.6% by weight for PbO 624 g, i.e. a proportion of 17.3% by weight for HEPA 285 g, i.e. a proportion of 8.3% by weight.

It is thus clear that sheaths comprising such agents can be produced for an active capacity of several years.

In the case of CO₂, whose value of permeability through the sheaths is of the same order of magnitude as that of H₂S, a similar calculation can be made, which shows that charges intended for CO₂ processing can be incorporated in a thermoplastic material to manufacture a sheath according to the invention.

FIG. 1 shows a flexible pipe structure comprising an inner frame made of interlocked steel tape or interlocked or nested wires 1, a sealing sheath 2, a layer of interlocked or nested wires 3, a sheath 4, armours 5, a strip 6 and an external sheath 7. At least one of sheaths 2 and 4 is made according to the present invention, preferably inner sheath 2. It is clear that the sheaths can be multilayered and consist of a first layer of thermoplastic without a chemically active product charge and of a second layer like the sheath according to the present invention. The layer according to the invention is preferably exterior to the first layer with respect to the axis of the pipe. The present invention also relates to a flexible pipe without an inner frame 1. The sheaths are manufactured from mixtures prepared at the melting temperature of the thermoplastic material by adding charges of neutralizing agents, prior to extrusion, possibly on a core.

Figure 2:
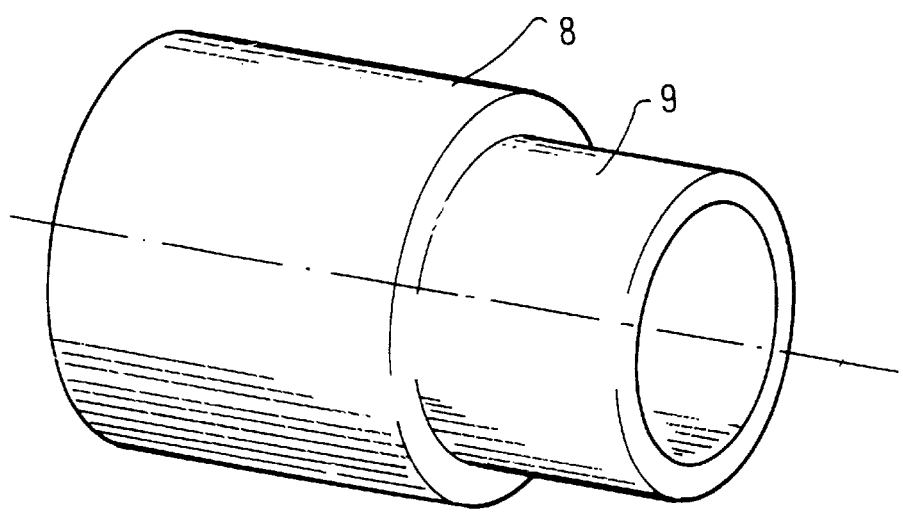
FIG. 2 shows a rigid line comprising a sheath according to the invention.

FIG. 2 shows a metal tube 8 comprising an inner lining comprising at least one sheath 9 according to the present invention. Setting inside tube 8 is performed according to well-known inner lining techniques.

Experimental Tests

The thermoplastic material (PE) used is a copolymer based on ethylene and C₃ to C₈ olefins marketed by FINA under reference number FINATHENE 3802.

Neutralization Tests

A 70-mm diameter and 2-mm thick membrane is manufactured from the PE mixed with the base. The membrane is confined in a CO₂ or H₂S atmosphere. The mass variation of the sample after confinement, followed by vacuum desorption at 40° C. for eight hours, gives the yield.

1) PE Charged with Dead Lime Ca(OH)₂

Mixture of PE and 50% by weight of Ca(OH)₂ and 5% of a compatibilizing product (for example LOTADER made by the ATOCHEM Company). Confining pressure 40 b at 80° C. for seven days.

| | |
|---|---|
| Initial weight (g) | 9.8883 |
| Final weight (g) | 11.7103 |
| Weight after desorption (g) | 11.5505 |
| Mass variation Δm | 1.6622 |
| Theoretical mass variation | 1.7371 |
| Yield | 95.1 |

The yield is the ratio of Δm to the theoretical mass variation calculated from complete neutralization.

2) PE Charged with PbO

Confining pressure 15 b of H₂S at 20° C. for seven days. Sample: mixture of PE+20% of PbO.

| | |
|---|---|
| Initial weight (g) | 4.9750 |
| Final weight (g) | 5.1050 |
| Weight after desorption (g) | 5.0015 |
| Mass variation | 0.0265 |
| Theoretical mass variation | 0.07 |
| Yield | 35.4 |

Permeability Tests

The permeability test was carried out at 40 b of CO₂ at 80° C.

In a cell, the PE thermoplastic membrane separates two chambers. One chamber contains the gas under pressure, the other being at atmospheric pressure.

The pressure increase with time is recorded in the downstream chamber. The lag time is the time from which the gas passes through the membrane in a steady state.

| Materials | Lag time (h) |
|---|---|
| PE alone | 1.23 |
| PE + 50% Ca(OH)₂ | 50 |
| PE + 50% Ca(OH)₂ + 5% LOTADER | 50 |
| PE + 35% Ca(OH)₂ | 29 |
| PE + 35% Ca(OH)₂ + 5% LOTADER | 28 |

In the disclosure, R in the formulae corresponds to the general radicals for a primary amine; R can be alkyl, alkoxy or H.

MEA is monoethanol amine; DEA is diethanol amine; DIPA is diisopropanol amine; MDEA is methyldiethanol amine. (These abbreviations are conventional.)

PEHA (pentaethylene hexamine) and HEPA (higher ethylene polyamine) correspond to the formula H₂N $(C_2H_4NH)_nH$, respectively with n=5 and n=5 to 7. These are product names from the firm Delamine BV. (NL).

The product LOTADER is a statistical terpolymer of ethylene, acrylic ester and glycidyl methacrylate produced by high pressure radical polymerization.

The preceding examples can be repeated with similar success by substituting the generically or specifically described reactants and/or operating conditions of this invention for those used in the preceding examples.

The entire disclosure of all applications, patents and publications, cited above and below, and of corresponding French application No.96/14.432, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pipe for the transportation of effluents containing $H_2S$ and/or $CO_2$ acid gases, which comprises a flexible or rigid metal tube and, disposed as a lining sheath inside said tube, an annular solid sheath made of an extrudable thermoplastic material having incorporated therein a product chemically active with $H_2S$ and/or $CO_2$ acid gases in an amount sufficient to irreversibly neutralize the corrosive effects of said acid gases and avoid their corrosive effects on said metal tube.

2. A pipe as claimed in claim 1, wherein said product chemically active with $H_2S$ and/or $CO_2$ acid gases is at least one metal oxide selected from the group consisting of PbO, ZnO, CuO, CdO, NiO, CoO, $SnO_2$ and $MoO_3$.

3. A pipe as claimed in claim 1, wherein said product chemically active with $H_2S$ and/or $CO_2$ acid gases comprises an amine.

4. A pipe as claimed in claim 1, wherein said product chemically active with $H_2S$ and/or $CO_2$ acid gases comprises an alkaline or alkaline-earth metal oxide.

5. A pipe as claimed in claim 1, wherein said thermoplastic material comprises polyolefins, polyamides or fluoropolymers.

6. The pipe of claim 1, wherein the metal tube is a flexible pipe having an armored metal covering.

7. The pipe of claim 1, wherein the metal tube is a rigid metal tube.

8. A pipe as claimed in claim 3, wherein said amine is a polyethylene amine.

9. A pipe as claimed in claim 4, wherein said alkaline or akaline earth metal oxide is $Ca(OH)_2$ or CaO.

10. A process comprising passing effluents comprising $H_2S$ or $CO_2$ through a pipe according to claim 6.

11. A process comprising passing effluents comprising $H_2S$ or $CO_2$ through a pipe according to claim 7.

12. A pipe as claimed in claim 1, wherein said annular solid sheath has been produced by extrusion of a mixture prepared at the melting temperature of the thermoplastic material by adding the chemically active product to said thermoplastic material.

13. The pipe of claim 1, wherein the product chemically active with $H_2S$ and/or $CO_2$ acid gases is incorporated into the thermoplastic material in an amount of 20–50% by weight.

* * * * *